United States Patent [19]

Shekleton

[11] Patent Number: 5,214,911
[45] Date of Patent: Jun. 1, 1993

[54] METHOD AND APPARATUS FOR HIGH ALTITUDE STARTING OF GAS TURBINE ENGINE

[75] Inventor: Jack R. Shekleton, San Diego, Calif.
[73] Assignee: Sundstrand Corporation, Rockford, Ill.
[21] Appl. No.: 803,741
[22] Filed: Dec. 4, 1991

Related U.S. Application Data

[63] Continuation of Ser. No. 455,605, Dec. 21, 1989, abandoned.

[51] Int. Cl.⁵ .................................. F23R 3/32
[52] U.S. Cl. .......................... 60/39.06; 60/39.142; 60/737
[58] Field of Search .............. 60/39.36, 760, 39.141, 60/39.143, 737, 738, 740, 746, 733, 39.06

[56] References Cited

U.S. PATENT DOCUMENTS

| | | | |
|---|---|---|---|
| 2,608,054 | 8/1952 | Price | 60/39.142 |
| 2,643,511 | 6/1953 | Briggs | 60/39.142 |
| 2,749,023 | 6/1956 | Lewis | 60/39.141 |
| 2,992,531 | 7/1961 | Hershey | |
| 3,098,626 | 7/1963 | Messinger | 60/39.142 |
| 4,033,115 | 7/1977 | Baits | 60/39.091 |
| 4,375,745 | 3/1983 | Schelp | 60/39.141 |
| 4,445,532 | 5/1984 | Mitchell | 60/39.142 |

FOREIGN PATENT DOCUMENTS

| | | | |
|---|---|---|---|
| 49327 | 3/1984 | Japan | 60/39.142 |
| 367662 | 4/1963 | Switzerland | 60/39.142 |

OTHER PUBLICATIONS

Lefebvre, Arthur H. *Gas Turbine Combustion*, Hemisphere Publ. Corp., New York, 1983, pp. 412 and 413.

Primary Examiner—Richard A. Bertsch
Assistant Examiner—Timothy S. Thorpe
Attorney, Agent, or Firm—Wood, Phillips, VanSanten, Hoffman & Ertel

[57] ABSTRACT

Difficulties in starting a gas turbine engine at high altitudes may be avoided by the method of starting such an engine which includes the steps of introducing fuel into the combustor (26) of the engine through at least one fuel injector (46) having an outlet (76, 78) within the combustor (26), atomizing the fuel with a burst of oxidant at elevated pressure from a source (92) of pressurized stored oxidant until ignition is obtained, and thereafter discontinuing the burst of oxidant from the source (92).

5 Claims, 2 Drawing Sheets

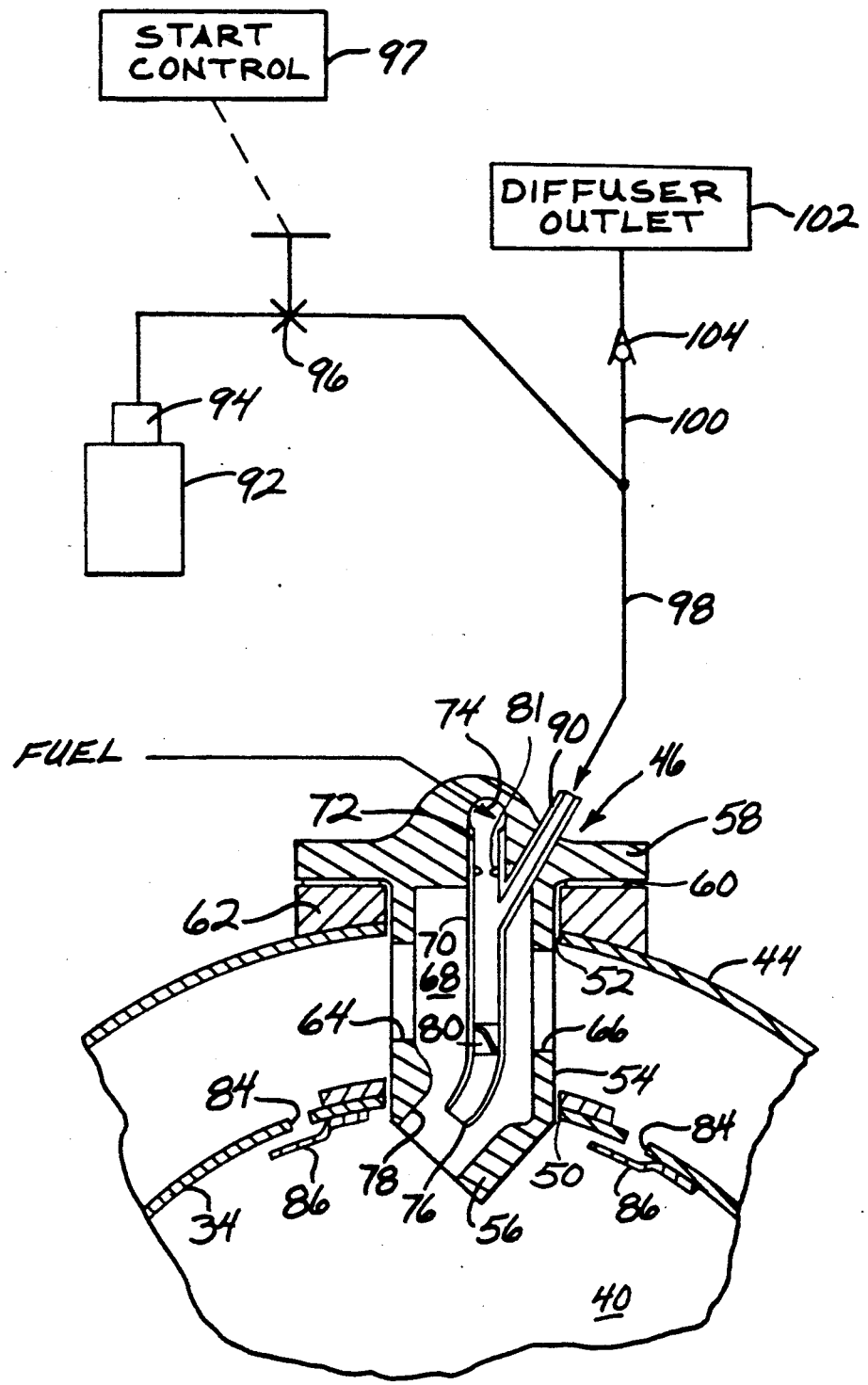

METHOD AND APPARATUS FOR HIGH ALTITUDE STARTING OF GAS TURBINE ENGINE

This application is a continuation of application Ser. No. 455,605, filed Dec. 21, 1989, now abandoned.

FIELD OF THE INVENTION

This invention relates to air breathing, gas turbine engines, and more particularly, to the starting of such engines at high altitudes.

BACKGROUND OF THE INVENTION

The starting of air breathing, gas turbine engines at high altitudes presents substantial difficulties, particularly in the case of relatively small gas turbine engines. At high altitudes, the temperature of the environment is quite cold with the consequence that fuels have high viscosity making it quite difficult to atomize the fuel sufficiently to ignite properly.

Furthermore, and as is well known, in the operation of turbine engines, the higher the altitude, the lower the fuel flow required to maintain any given standard of operation. Consequently, at high altitudes, relatively low fuel flows are required and that in turn means a reduction in the pressure applied to the fuel to achieve the reduced flow rate. Thus, where the turbine fuel injectors are of the pressure atomization type, the lesser fuel pressure utilized at high altitude means insufficient pressure to cause the required degree of atomization necessary to achieve a start. If it is attempted to overcome this difficulty by increasing the pressure, frequently, expensive altitude compensation control systems for fuel flow must be added to the system and even then, there will frequently be over fueling of the engine which in turn results in hot spots once ignition is obtained.

Further, particularly in the case of relatively small turbine engines, it is necessary to utilize so-called "start injectors" in addition to main fuel injectors. Start injectors are specially designed to provide the desired degree of atomization at maximum operating altitudes and typically are used only during the starting operation. They are turned off after ignition is obtained with fuel thereafter being supplied by the main fuel injectors. Again, the use of special injectors such as start injectors undesirably adds to the cost of the engine and still may not provide the desired degree of start reliability at high altitude of, say, thirty thousand or forty thousand feet.

The present invention is directed to overcoming one or more of the above problems

SUMMARY OF THE INVENTION

It is a principal object of the invention to provide a new and improved method of starting a gas turbine engine at high altitudes. It is also a principal object of the invention to provide a new and improved, high altitude starting-turbine.

According to one aspect of the invention, the foregoing objects are achieved in a method of starting a gas turbine engine at high altitudes including the steps of injecting fuel into a combustor for the engine through a fuel tube at a relatively low fuel rate, momentarily subjecting the fuel at an injection port on a tube or upstream thereof to a blast of oxidant at an elevated pressure and which is taken from a compressed oxidant storage vessel, and igniting the fuel. In a highly preferred embodiment, this method is practiced in a gas turbine engine having a rotary compressor driven by a turbine wheel, a nozzle for directing gases of combustion at the turbine wheel and connected to the outlet of an annular combustor, a plenum in fluid communication with the compressor and disposed about the combustor, and a plurality of angularly spaced fuel injectors about the combustor. Each fuel injector includes a housing having an outlet within the combustor and an air inlet within the plenum along with a fuel tube extending within the housing into proximity to the outlet. The end of the fuel tube adjacent the outlet defines the fuel injection port and the fuel tube further may include a fuel metering formation within the fuel tube upstream of the fuel injection port.

According to one embodiment of the invention, the step of subjecting the fuel to a blast of oxidant is performed for only a few seconds. In one form of the invention, it is performed by directing oxidant toward the outlet of the housing and about the end of the fuel tube defining the port. In another embodiment of the invention, the step is performed by directing oxidant into the fuel tube downstream of the fuel metering formation and upstream of the end defining the injection port.

The invention also contemplates the provision of a high altitude starting gas turbine including a compressor, a turbine wheel, a nozzle, a combustor and a plenum all oriented as stated previously. At least one fuel injector extends into the combustor and has an outlet therein along with a first air inlet within the plenum, a fuel injecting conduit and a second oxidant inlet along with means connected to the second inlet and associated with the conduit for directing a blast of oxidant at fuel flowing through the conduit to atomize the same. The invention further includes an oxidant storage vessel for storing oxidant at an elevated pressure and a means for selectively connecting the vessel to the second inlet to provide the blast of oxidant.

In a preferred embodiment, the selective connecting means includes a pressure regulator and a flow control valve.

In one embodiment of the invention, an air conduit interconnects the plenum and the second oxidant inlet. A check valve is located in the air conduit and is disposed to permit flow through the air conduit toward the second oxidant inlet from the plenum and to prevent reverse flow. As a result of this configuration, during starting, oxidant may be supplied to the second inlet from the storage source as mentioned previously while after ignition is obtained, air may be supplied to the second oxidant inlet from the downstream side of the engine compressor to which the plenum is connected.

Other objects and advantages will become apparent from the following specification taken in connection with the accompanying drawings.

DESCRIPTION OF THE DRAWINGS

FIG. 2 is a partial sectional view and partial schematic of one embodiment of the gas turbine engine.

DESCRIPTION OF THE PREFERRED EMBODIMENTS

Figure 1:
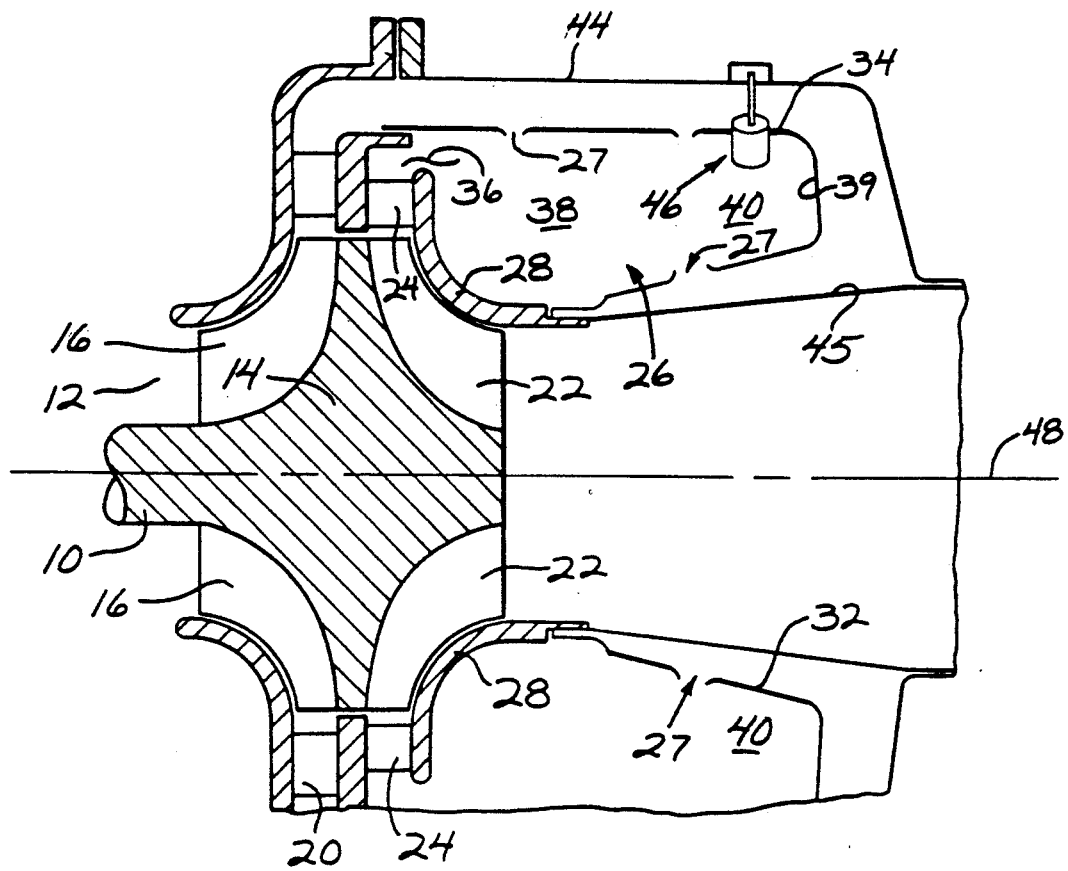
FIG. 1 is a somewhat schematic, sectional view of a gas turbine engine made according to the invention.

Exemplary embodiments of a gas turbine made according to the invention are illustrated in the drawings in the form of radial flow, air breathing gas turbines.

However, the invention is not limited to radial flow turbines and may have applicability to any form of air breathing turbine.

The turbine includes a rotary shaft 10 journaled by bearings not shown. Adjacent one end of the shaft 10 is an inlet area 12. The shaft 10 mounts a rotor, generally designated 14, which may be of conventional construction. Accordingly, the same includes a plurality of compressor blades 16 adjacent the inlet 12. A compressor blade shroud 18 is provided in adjacency thereto and just radially outwardly of the radially outer extremities of the compressor blades 18 is a conventional vaned diffuser 20, all to define a rotary compressor.

Oppositely of the compressor blades 16, the rotor 14 has a plurality of turbine blades 22 which, along with the adjacent part of the rotor 14 define a turbine wheel. The body of the rotor 14 itself effectively couples the turbine wheel thus defined to the rotary compressor.

Just radially outwardly of the turbine blades 22 is an annular nozzle 24 which is adapted to receive hot gases of combustion from an annular combustor, generally designated 26. The compressor system including the blades 16, shroud 18 and diffuser 20 delivers compressed air to the annular combustor 26, and via dilution air passages 27, to the nozzle 24 along with gases of combustion. That is to say, hot gases of combustion from the combustor are directed via the nozzle 24 against the blades 22 to cause rotation of the rotor, and thus the shaft 10. The latter may be, of course, coupled to some sort of apparatus requiring the performance of useful work.

A rear turbine shroud 28 is interfitted with the combustor 28 to close off the flow path from the nozzle 24 and confine the expanding gas to the area of the turbine blades 22. The combustor 26 has a generally cylindrical inner wall 32 and a generally cylindrical outer wall 34. The two are basically concentric and merge to a necked down area 36 which serves as an outlet from an interior annulus 38 of the combustor 26 to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor 26 includes a primary combustion zone 40 in which the burning of fuel primarily occurs. Other combustion may, in some instances, occur downstream from the primary combustion area 40 in the direction of the outlet 36. As mentioned earlier, provision is made for the injection of dilution air through the passages 27 into the combustor 26 downstream of the primary combustion zone 40 to cool the gases of combustion to a temperature suitable for application to the turbine blades 22 via the nozzle 24. However, in some instances, where other provision for cooling the combustor 26 is made, the dilution air passages 27 may be omitted.

In any event, it will be seen that the primary combustion zone 40 is an annulus or annular space defined by the generally radially inner wall 32, the generally radially outer wall 34, and the radially extending wall 39.

An annular wall 44 of L-shaped section as seen in FIG. 1 is connected to a radially inner, annular wall 45 and both are in generally concentric relation to the corresponding walls of the combustor 26 from which they are spaced. The walls 44 and 45 serve as a case for the combustor 26 and define a plenum in fluid communication with the outlet of the diffuser 20 which contains and directs compressed air from the compressor system to the combustor 26.

Mounted on the wall 44, and extending through the wall 34 are injectors, generally designated 46.

Though not shown herein, according to a preferred embodiment of the invention, there will be a plurality of injectors 46 equally angularly spaced about the axis of rotation 48 of the shaft 10. The injectors 46 extend into the primary combustion zone by means of aligned apertures 50 and 52 respectively in the walls 34 and 44 as seen, for example, in FIGS. 2 and 3.

With reference to FIG. 2, each injector 46 includes a generally cylindrical housing 54 terminating in a radially inwardly directed elbow section 56. Opposite the elbow section 56, the housing 54 has a peripheral retaining flange 58 which may be sealed by a gasket 60 against the mounting surface 62 on the exterior of the radially outer wall 44.

That part of the housing 54 disposed between the walls 34 and 44 is provided with one or more openings 64, 66 which open to the plenum between the walls 34 and 44. Thus, compressed air from the compressor may flow through the holes 64, 66 to the interior of the housing 54.

Within the interior of each housing 54 there is disposed a somewhat J-shaped tube 70. The radially outer end 72 of the tube 70 is in fluid communication with a fuel manifold 74 connected to the fuel system for the engine. The radially inner end 76 of the tube 70 is angled to correspond with the elbow section 56 of the housing 54 and to be centered about a reduced diameter outlet opening 78 therein. Optionally, a fuel swirler 80 may be located within the tube 70 in proximity to the end 76 which serves as an injector nozzle or fuel port.

Well upstream of the port 76, and in close adjacency to the manifold 74, the tube 70 may include an internal orifice 81 which acts as a fuel metering orifice for fuel flow through the tube 70.

The angle of the elbow section 56 and the end 76 of the tube 70 is such that both fuel and air will enter the primary combustion zone 40 generally tangentially. Provision may also be made for the introduction of dilution air into the periphery of the primary combustion zone 40 in a tangential direction by the provision of a series of axial lines of apertures 84 and axially elongated cooling strips 86 as illustrated in both FIGS. 2 and 3.

The tangential injection of fuel and combustion air via the injectors 46 as well as tangential introduction of dilution air as just described provides for a high degree of circumferential swirl within the primary combustion zone 40 and thus is highly desirable, though not absolutely necessary, in practicing the invention since it minimizes the number of injectors required to provide an even distribution of mixed air and fuel. This feature of the invention eliminates hot spots even if one or more of the injectors should clog. Thus, the invention lends itself readily to use in relatively small turbine engines which, because of their relatively small size, have utilized extremely small fuel injection passages in their fuel injectors which are highly subject to clogging. Individual passage size for a given engine can be increased by reducing the number of injectors, thereby allowing each injector to have a larger fuel passage. Any resulting tendency to develop hot spots is eliminated because the swirl of burning fuel in the primary combustion zone 40 provides even temperature distribution throughout during normal operation.

The injectors 46 are basically air blast atomization injectors. That is to say, the compressed air from the compressor moving through the constricted opening 78 of the housing 54 as a result of the fluid communication established by the openings 64 and 66 with the plenum connected to the outlet of the diffuser 20 causes atomization of fuel exiting through the injection port 76 of the tube 70. This, of course, is perfectly satisfactory during normal operation of the engine when the compressor is providing compressed air to effect such air blast atomization. However, when the turbine is quiescent and must be started, other means of effecting the necessary atomization must be employed since compressed air from the compressor will not be available at this time.

As alluded to earlier, in prior art apparatus, this is effected by so-called pressure atomization systems. In large turbine engines, it may be effected through pressure atomization at main fuel injectors without the use of start fuel injectors. Conversely, in small turbine engines, one or more start injectors might be employed.

According to the present invention, which is ideally suited for use in small turbine engines, start injectors are avoided as are pressure atomization systems.

With reference to FIG. 2, each tube 70, intermediate the end 76 and the flow metering formation or orifice 81 includes a branch tube 90 which serves as a second oxidant inlet to the injector 46. The first oxidant inlet is, of course, in the form of the openings 64, 66.

According to the invention, a relatively small high pressure storage vessel or bottle 92 is provided. A pressure regulator 94 is connected to the outlet of the bottle 92 which in turn is connected to a flow control valve 96. A control system 97 which may be basically conventional and is employed in starting the engine is utilized to open or close the valve 96 as desired and the outlet side of the valve 96 is connected via a conduit 98 through the branch tube 90.

According to the invention, when a start procedure for the engine is initiated, the valve 96 is opened by the control system 97 and compressed oxidant, typically in the form of air or even molecular oxygen, from the bottle 92 is supplied to the tube 70 along with fuel. In one case, if at an altitude of forty thousand feet, an absolute pressure of 17 psi is applied to the tube 90 from the bottle 92, an oxidant velocity in excess of 500 feet per second may be obtained with the flowing oxidant which will provide excellent atomization of even extremely viscous fuels being flowed into the tube 70 from the manifold 72. It is significant to note that the branch tube 90 enters the tube 70 downstream of the fuel metering formation or orifice 81 so the application of pressurized oxidant to the tube 90 does not interfere with the desired flow of fuel from, or cause backflow toward the source because the orifice 81 provides an isolating effect.

In a worst case, typically the valve 96 need be opened only for a few seconds. Two seconds will normally be sufficient and because of the short time the valve 96 is open, the vessel 92 may be made of relatively small size, its dimensions being measured in inches rather than feet.

Once the engine is started, the improved atomization provided by the application of pressurized air to the branch tube 90 may be maintained after closure of the valve 96 if desired by means of a conduit 100 connected to the conduit 98. The conduit 100 is placed in fluid communication with the outlet 102 of the diffuser 20 (FIG. 1). Thus, once the engine is operating, compressed air from the compressor will sustain the injection of air even after the valve 96 is closed by the start control 97.

To prevent oxidant backflow during start-up, a check valve 104 is located in the line 100 between the diffuser outlet 102 and the line 98 and is disposed so as to allow flow from the diffuser outlet 102 toward the tube 90 but not the reverse.

Figure 3:
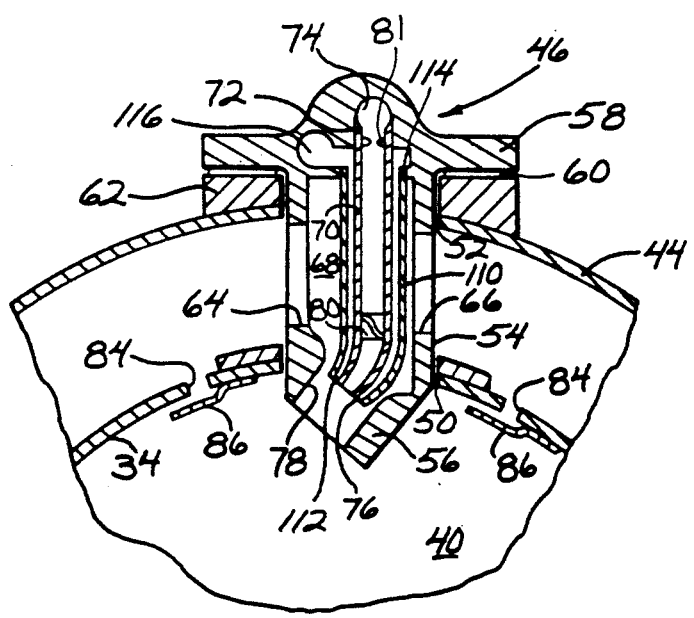
FIG. 3 is a sectional view illustrating a modified embodiment of the invention.

FIG. 3 illustrates an alternative form of the invention although the same employs a number of components identical or extremely similar to those described previously. In the interest of brevity, like components have been given like reference numbers and will not be redescribed.

Concentrically about the fuel injection tube 70 and in spaced relation thereto is an oxidant tube 110. The oxidant tube 110 terminates in an annular port 112 surrounding the port 76 at the end of the fuel tube 70. The opposite end 114 of the oxidant tube 110 is in fluid communication with an oxidant manifold 116 within the housing 54 and which may be connected to the line 98 shown in FIG. 2. Operation again is essentially the same with the atomization of fuel exiting the port 76 being caused by the same being subjected to a high velocity blast of oxidant emanating from the port 112. Again, the oxidant blast is maintained only momentarily, typically for a few seconds, until ignition is achieved within the combustor by means of an igniter (not shown) of conventional construction.

From the foregoing, it will be appreciated that even at the low fuel flows encountered in small gas turbine engines at high altitudes, excellent atomization of fuel sufficient to insure reliable starts without overfueling may be obtained through use of the invention. If the storage source 92 is constructed so as to store oxidant at several thousand pounds per square inch, hundreds of starts may be obtained from a single stored charge because of the short duration of the oxidant blast utilized for enhanced atomization. Consequently, the use of expensive start injectors may be avoided as can be the use of highly sophisticated altitude compensation systems. Considerable cost savings result.

In addition, when the oxidant blast is employed with all the main injectors in an engine, poor fuel distribution from one injector to the next due to the effects of so-called "manifold head" at high altitude is avoided because of the uniformity of injection achieved by the high velocity oxidant passing through each of the injectors.

I claim

1. A method of starting a gas turbine engine at high altitude comprising the steps of:
    (a) introducing fuel into the combustor of the engine through at least one fuel injector including an elongated conduit having an outlet within the combustor;
    (b) atomizing the fuel with a burst or oxidant at elevated pressure from a source pressurized stored oxidant until ignition is obtained by introducing said burst into said elongated conduit from a location internal to the injector(s) and upstream of said outlet to atomize fuel in said elongated conduit and such that said atomized fuel is ejected from said outlet of said conduit in a spray generally tangential to an outer wall of said combustor; and
    (c) thereafter discontinuing the burst of oxidant from said source.

2. The method of claim 1 wherein said conduit includes an internal fuel metering means upstream of said outlet and the step of introducing said burst occurs between said outlet and said fuel metering means.

3. A method of high altitude starting a gas turbine having a rotary compressor driven by a turbine wheel, a nozzle for directing gases of combustion at the turbine wheel and connected to the outlet of an annular combustor, a plenum in fluid communication with the compressor and disposed about the combustor and a plurality of angularly spaced air blast atomization fuel injectors about said combustor and each including a housing having an outlet within the combustor, an air inlet within the plenum and an elongated fuel tube extending within the housing into proximity to the outlet and defining a fuel injection port thereat, and a fuel metering formation within said fuel tube upstream of said fuel injection port, the steps of:
   a) injecting fuel into said combustor through said fuel tube at a relatively low flow rate;
   b) momentarily subjecting the fuel in said elongated fuel tube upstream of said port to a blast of oxidant at an elevated pressure and taken from a compressed oxidant storage vessel, said blast atomizing said fuel in said fuel tube and said fuel tube ejecting said atomized fuel from said port in a spray generally tangential to an outer wall of said combustor; and
   c) igniting the fuel.

4. The method of claim 3 wherein step b) is performed for only a few seconds.

5. A method of high altitude starting an aircraft carried gas turbine having a rotary compressor driven by a turbine wheel, a nozzle for directing gases of combustion at the turbine wheel and connected to the outlet of an annular combustor, a plenum and fluid communication with the compressor and disposed about the combustor and a plurality of angularly spaced air-blast atomization fuel injectors about said combustor and each including a housing having an outlet within the combustor, an air inlet within the plenum and an elongate fuel tube extending within the housing into proximity to the outlet, the end of the fuel tube adjacent said outlet defining a fuel injection port, and a fuel metering formation within said fuel tube upstream of said fuel injection port, the steps of:
   a) injecting fuel into said combustor through said fuel tube at a relatively low fuel rate;
   b) momentarily subjecting the fuel at said port to a blast of oxidant at an elevated pressure from a compressed oxidant storage vessel, wherein said oxidant is directed by an elongated oxidant tube surrounding and substantially concentric with said fuel tube, and wherein said fuel is atomized and directed in a spray generally tangential to an outer wall of said combustor by said oxidant in said oxidant tube; and
   c) igniting the fuel.

* * * * *